US010902962B2

(12) United States Patent
Wang et al.

(10) Patent No.: US 10,902,962 B2
(45) Date of Patent: Jan. 26, 2021

(54) NUCLEAR POWER PLANT SPENT FUEL NEGATIVE PRESSURE UNLOADING SYSTEM

(71) Applicant: TSINGHUA UNIVERSITY, Beijing (CN)

(72) Inventors: Jinhua Wang, Beijing (CN); Zuoyi Zhang, Beijing (CN); Bin Wu, Beijing (CN); Yue Li, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 298 days.

(21) Appl. No.: 16/063,186

(22) PCT Filed: Dec. 31, 2015

(86) PCT No.: PCT/CN2015/100236
§ 371 (c)(1),
(2) Date: Jun. 15, 2018

(87) PCT Pub. No.: WO2017/113345
PCT Pub. Date: Jul. 6, 2017

(65) Prior Publication Data
US 2019/0006054 A1 Jan. 3, 2019

(51) Int. Cl.
G21C 19/32 (2006.01)
G21C 19/20 (2006.01)
(Continued)

(52) U.S. Cl.
CPC .......... G21C 19/32 (2013.01); G21C 19/202 (2013.01); G21C 1/07 (2013.01); G21C 3/045 (2019.01)

(58) Field of Classification Search
CPC ...... G21C 19/32; G21C 19/202; G21C 3/045; G21C 1/07
(Continued)

(56) References Cited

U.S. PATENT DOCUMENTS 2,910,416 A * 10/1959 Daniels ................ G21C 19/202
376/265
3,046,212 A * 7/1962 Anderson ................ G21C 1/22
376/266
(Continued)

FOREIGN PATENT DOCUMENTS

CN 101083153 A 12/2007
CN 101740147 A 6/2010
(Continued)

OTHER PUBLICATIONS

International Search Report and Written Opinion from PCT/CN2015/100236, dated Sep. 30, 2016, 5 pages.

Primary Examiner — Jack W Keith
Assistant Examiner — Daniel Wasil
(74) Attorney, Agent, or Firm — Morgan, Lewis & Bockius LLP

(57) ABSTRACT

A nuclear power plant spent fuel negative pressure unloading system comprises a fuel element transport pipe and a gas transport pipe. The fuel element transport pipe comprises a fuel element output pipe, a fuel element lifting pipe, and a fuel element unloading pipe connected in series. The fuel element unloading pipe is arranged obliquely downward in the direction of fuel element movement. The distal end of the fuel element unloading pipe is connected sequentially to fuel loading apparatus and a transfer apparatus. Two nozzles of the gas transport pipe are connected to set positions on the fuel element output pipe and the fuel element unloading pipe respectively. A gas driving mechanism is connected to the gas transport pipe. An inlet of the gas driving mechanism is arranged at one end in proximity to the fuel element unloading pipe.

10 Claims, 4 Drawing Sheets

(51) Int. Cl.
 *G21C 3/04* (2006.01)
 *G21C 1/07* (2006.01)
(58) Field of Classification Search
 USPC .................................................. 376/264, 266
 See application file for complete search history.

(56) References Cited

U.S. PATENT DOCUMENTS 4,863,674 A * 9/1989 Handel ................ G21C 19/202
 376/265
2003/0234096 A1 12/2003 Lee et al.

FOREIGN PATENT DOCUMENTS

| CN | 101853708 A | 10/2010 |
| CN | 102201269 A | 9/2011 |
| CN | 102750996 A | 10/2012 |
| CN | 103474113 A | 12/2013 |

* cited by examiner

NUCLEAR POWER PLANT SPENT FUEL NEGATIVE PRESSURE UNLOADING SYSTEM

TECHNICAL FIELD

The present disclosure relates to the technical field of reactor engineering, and particularly, to a nuclear power plant spent fuel negative pressure unloading system.

BACKGROUND

China is currently actively developing pebble bed modular high temperature gas-cooled reactor nuclear power plant. High temperature reactor nuclear power plant is recognized as a nuclear power plant with main features of the fourth generation of nuclear power plants, which has advantages of inherent safety, preventing nuclear proliferation, producing high temperature process heat and so forth.

High temperature gas-cooled reactor can be divided into two categories according to the shape of fuel elements. One category is the pebble bed high temperature gas-cooled reactor which utilizes spherical fuel elements, and the other category is the prismatic high temperature gas-cooled reactor which utilizes prismatic fuel elements. Both the spherical fuel element and the prismatic fuel element are dispersed with coated fuel particles, and the diameter of the coated fuel particles is about 1 mm. The spherical fuel element is made by thoroughly mixing a certain amount of fuel particles and matrix graphite, pressing the mixture into graphite pebbles with a diameter of 50 mm, and then wrapping and pressing a layer of pure graphite on their outside as a housing of the fuel element, and the pressed fuel element has an outer diameter of 60 mm.

Fissile material in the fuel elements of the pebble bed high temperature gas-cooled reactor will release a large quantity of heat, that is, nuclear energy, in the fission process. When fissile material is consumed to a certain extent, it will become spent fuel, which is mainly characterized in that it has a strong radioactivity and needs radiation shielding. The spherical spent fuel discharged from the reactor core of the pebble bed high temperature gas-cooled reactor requires the use of a suitable unloading system, which loads the spent fuel element discharged from the reactor into a storage canister suitable for storage of the spherical fuel element, sealing the storage canister after filling it up, and then storing it in a suitable storage facility.

SUMMARY

1. The Technical Problem to be Solved

The technical problem to be solved by the present disclosure is to solve the problem of how to safely unload spent fuel elements discharged from a reactor.

2. Technical Solution

In order to solve the technical problem above, the present disclosure provides a nuclear power plant spent fuel negative pressure unloading system, comprising a fuel element transport pipe and a gas transport pipe. The fuel element transport pipe comprises a fuel element output pipe, a fuel element lifting pipe, and a fuel element unloading pipe connected in series. The fuel element unloading pipe is arranged obliquely downward in the direction of movement of a fuel element. The distal end of the fuel element unloading pipe is connected sequentially to a fuel loading apparatus and a transfer apparatus. The gas transport pipe is connected at either end thereof respectively to set positions of the fuel element output pipe and the fuel element unloading pipe. A gas driving mechanism is connected to the gas transport pipe. An inlet of the gas driving mechanism is arranged at an end in proximity to the fuel element unloading pipe for sucking gas in the fuel element transport pipe, the fuel loading apparatus and the transfer apparatus and releasing the gas to the fuel element output pipe via the gas transport pipe so as to drive the movement of the fuel element.

According to the present disclosure, an iodine adsorber is installed between the end of the gas transport pipe in proximity to the fuel element unloading pipe and the gas driving mechanism.

According to the present disclosure, a dust filter is installed between the end of the gas transport pipe in proximity to the fuel element unloading pipe and the gas driving mechanism.

According to the present disclosure, an outlet pipe in parallel with the gas transport pipe is connected to the outlet of the gas driving mechanism for connecting with the atmosphere.

According to the present disclosure, the fuel elements comprise spent fuel elements and graphite pebble elements.

According to the present disclosure, a radiation measuring instrument is installed at the inlet of the fuel element output pipe, the fuel loading apparatus and the transfer apparatus comprise a graphite pebble loading apparatus and a graphite pebble transfer apparatus connected sequentially and a spent fuel loading apparatus and a spent fuel transfer apparatus connected sequentially, an element dispenser is installed at the distal end of the fuel element unloading pipe, and the two outlets of the element dispenser are connected with the graphite pebble loading apparatus and the spent fuel loading apparatus through pipes, respectively.

According to the present disclosure, ball valves are installed on the pipes through which the two outlets of the element dispenser are connected with the graphite pebble loading apparatus and the spent fuel loading apparatus respectively, for controlling opening and closing of the pipes.

According to the present disclosure, the fuel loading apparatus comprises a feeding pipe, a fuel loading pipe, a lifting slider and a driving motor; a canister plug claw is installed in the fuel loading pipe, a cylinder is installed above the fuel loading pipe, a telescopic rod of the cylinder is connected with the canister plug claw, and a fuel discharging port is fixed to the lower end of the fuel loading pipe; one end of the feeding pipe is connected with the distal end of the fuel element unloading pipe, and the other end is connected with the fuel loading pipe; the cylinder is connected to the lifting slider, and the driving motor is used to drive the lifting slider to move up and down.

According to the present disclosure, the transfer apparatus comprises a storage canister, a shield top cover, a shield cylindrical body, a movable bottom plate which realizes opening and closing of the shield cylindrical body by drawing, a moving mechanism which drives the storage canister to move in two vertical directions, and a hoisting system for hoisting the storage canister, wherein the shield top cover and the shield cylindrical body are connected and fixed, the movable bottom plate is located at the bottom of the shield cylindrical body for supporting the storage canister, and a shield fuel loading port is installed on the shield top cover.

According to the present disclosure, a vent which is connected with an air intake pipe is set on the movable bottom plate; and a vent which is connected with an air exhaust pipe is set on the shield top cover.

3. Advantageous Effects

The above-mentioned technical solution of the present disclosure has the following advantages as compared with the prior art: the nuclear power plant spent fuel negative pressure unloading system provided by the present disclosure is a closed system, and the oxygen content in the system is very little. During spent fuel loading, even if the temperature of the spent fuel is high, the spent fuel element will not undergo significant oxidation due to high temperature, thereby guaranteeing the integrity of the fuel elements within the transfer apparatus. The spent fuel negative pressure unloading system in the present disclosure has maintained a negative pressure state for the fuel element transport pipe, the fuel loading apparatus and the transfer apparatus in the fuel loading process, which can effectively prevent the uncontrollable release of graphite dust and radioactive gases generated in the spent fuel and ensure that the graphite dust is retained by the dust filter and the radioactive gases can be adsorbed by the iodine adsorber, thereby guaranteeing the safety of the spent fuel loading system.

LIST OF REFERENCE NUMBERS

1: gas transport pipe; 2: radiation measuring instrument; 3: first gas diverter; 4: first ball counter; 5: fourth ball counter; 6: second ball valve; 7: second ball counter; 8: second gas diverter; 9: third ball counter; 10: first ball valve; 11: element dispenser; 12: dust filter; 13: iodine adsorber; 14: forth globe valve; 15: second fan; 16: fifth globe valve; 17: ventilation device room; 18: sixth globe valve; 19: first fan; 20: second globe valve; 21: third globe valve; 22: first globe valve; 23: third ball valve; 24: fifth ball counter; 26: spent fuel loading apparatus; 27: air exhaust pipe; 28: shield cylindrical body; 29: trolley; 30: small wheel group; 31: air intake pipe; 32: movable bottom plate; 33: spent fuel storage canister; 34: large wheel group; 35: bridge; 36: railcar; 37: auxiliary driving motor; 38: graphite pebble storage canister; 39: graphite pebble loading apparatus; 42: shield top cover; 43: hanger; 51: hoisting hoister group; 52: pulley; 53: wire rope; 54: trolley rail; 55: bridge rail; 60: upper panel; 61: primary driving motor; 62: walking wheel group; 63: longitudinal rail; 64: fixed mount; 65: sliding bracket; 71: slider driving motor; 72: cylinder; 73: feeding pipe; 74: lifting slider; 75: fuel loading skew tee; 75-1: shield cylindrical body; 76: fuel loading pipe; 77: fuel element discharging port; 81: spherical head plate; 82: elliptic head plate; 83: nozzle; 84: top plate; 85: supporting rib; 86: supporting bottom plate, 87: fuel element transport pipe; 88: fuel element output pipe; 89: fuel element lifting pipe; 90: fuel element unloading pipe; 91: transfer apparatus; 92: gas driving mechanism; 93: outlet pipe; 92O: outlet of the gas driving mechanism; 94: spent fuel transfer apparatus; 11O: two outlets of the element dispenser; 11P: the pipes through which the two outlets of the element dispenser are connected; 95: canister plug claw; 96: telescopic rod; 97: moving mechanism; 98: shield fuel loading port; 99: vent which is connected with the air intake pipe; 100: vent which is connected with the air exhaust pipe.

DETAILED DESCRIPTION

In order to make the purposes, technical solutions and advantages of the embodiments of the present disclosure more clear, hereinafter, apparent and full descriptions for the technical solutions in the embodiments of the present disclosure will be made in combination with the drawings in the embodiments of the present disclosure. It is apparent that the described embodiments are a part of the embodiments of the present disclosure, not all of the embodiments. Based on the embodiments of the present disclosure, all of other embodiments obtained by those of ordinary skilled in the art without creative work belong to the scope of the present disclosure.

Figure 1:
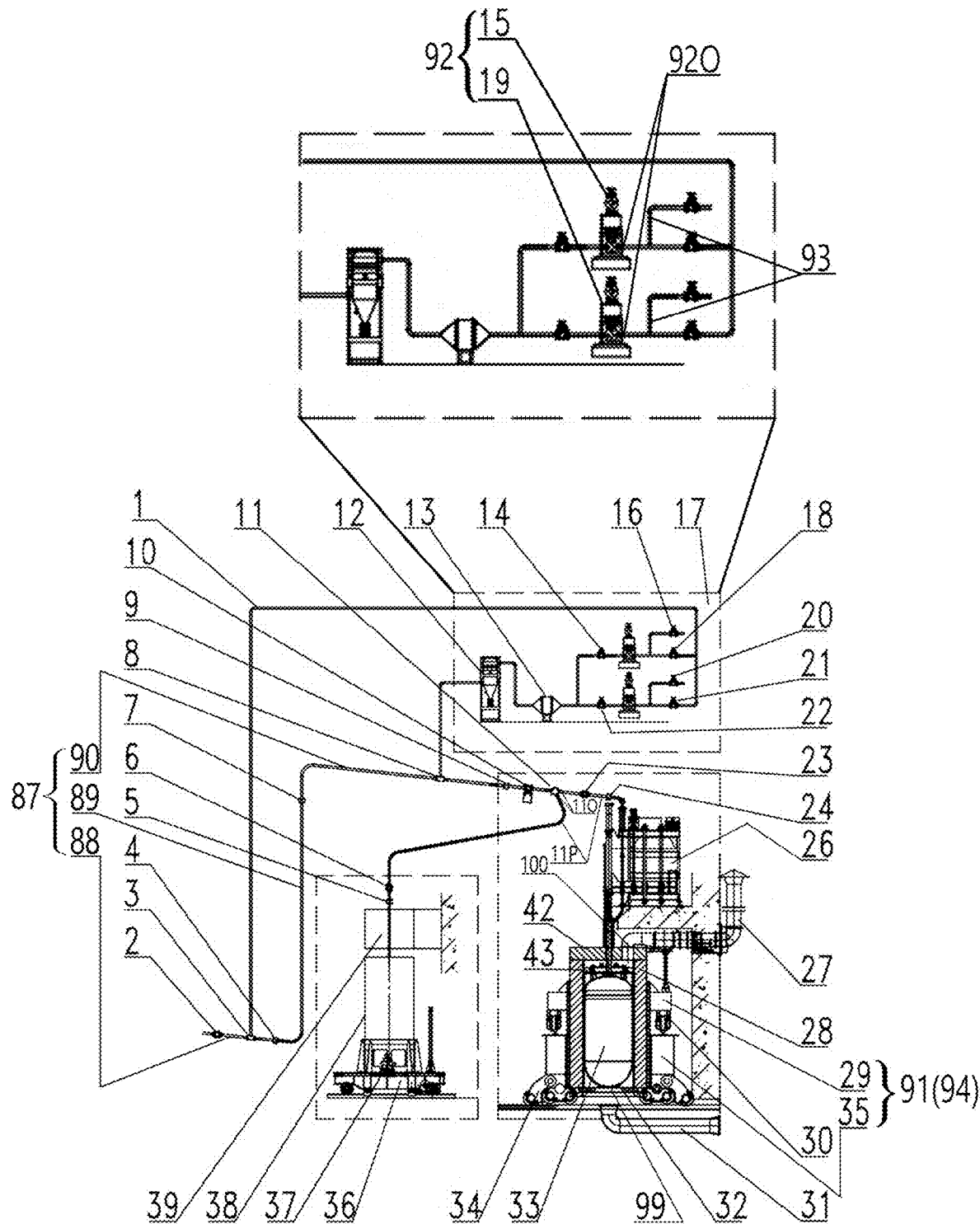
FIG. 1 is a structural schematic diagram of the nuclear power plant spent fuel negative pressure unloading system of an embodiment of the present disclosure.

As illustrated in FIG. 1, a nuclear power plant spent fuel negative pressure unloading system provided by an embodiment of the present disclosure comprises a fuel element transport pipe 87 and a gas transport pipe 1, and specifically, the fuel element in the present embodiment comprises spent fuel element and graphite pebble element. The fuel element transport pipe 87 comprises fuel element output pipe 88, fuel element lifting pipe 89, and fuel element unloading pipe 90 connected in series. The fuel element lifting pipe 89 is arranged vertically for lifting fuel element at a lower position to a certain height for subsequent unloading processing. The fuel element unloading pipe 90 is arranged obliquely downward in the direction of fuel element movement. The distal end of the fuel element unloading pipe 90 is connected sequentially to fuel loading apparatus and a transfer apparatus 91; specifically, a radiation measuring instrument 2 is installed at the inlet of the fuel element output pipe 88, the fuel loading apparatus and the transfer apparatus 91 comprise a graphite pebble loading apparatus 39 and a graphite pebble transfer apparatus connected sequentially and a spent fuel loading apparatus 26 and a spent fuel transfer apparatus 94 connected sequentially, an element dispenser 11 is installed at the distal end of the fuel element unloading pipe 90, and the two outlets 11O of the element dispenser 11 are connected with the graphite pebble loading apparatus 39 and the spent fuel loading apparatus 26 through pipes, respectively. The gas transport pipe 1 is connected at either end thereof respectively to set positions on the fuel element output pipe 88 and the fuel element unloading pipe 90. Specifically, a first gas diverter 3 is installed at the junction of the gas transport pipe 1 and the fuel element output pipe, and the first gas diverter 3 allows driving gas to enter into the fuel element transport pipe 87 from the gas transport pipe 1. A second gas diverter 8 is installed at the junction of the gas transport pipe 1 and the fuel element unloading pipe 90, and the first gas diverter 8 allows driving gas to flow into the gas transport pipe 1 from the fuel element transport pipe 87. A gas driving mechanism 92 is connected onto the gas transport pipe 1. In the present embodiment, the gas driving mechanism 92 utilizes a fan. An inlet of the fan is arranged at an end in proximity to the fuel element unloading pipe 90 for sucking gas in the fuel element transport pipe 87, the fuel loading apparatus and the transfer apparatus 91 and releasing the gas to the fuel element output pipe via the gas transport pipe 1 so as to drive the movement of the fuel element. Specifically, a fourth ball counter 4 is installed between the first gas diverter 3 on the fuel element output pipe and the fuel element lifting pipe 89 for counting the number of fuel elements discharged from the reactor. A second ball counter 7 is installed at the upper part of the fuel element lifting pipe 89 for counting the number of fuel elements successfully lifted to the upper part of the fuel element lifting pipe 89. A third ball counter 9 is installed between the gas diverter on the fuel element unloading pipe 90 and an element dispenser 11 for counting the total number of the fuel elements unloaded to the fuel loading apparatus. A first ball valve 10 is installed between the third ball counter 9 and the first ball valve 10 for controlling opening and closing of the fuel element transport pipe 87 and the fuel loading apparatus.

In use, starting the fan, and the fuel elements discharged from the reactor enter the fuel element lifting pipe 89 from the fuel element output pipe 88 under the driving of gas and are further lifted to the fuel element unloading pipe 90. The gas flows into the fan via the second gas diverter 8. Since the fuel element unloading pipe 90 is arranged obliquely downward, the fuel elements can enter into the fuel loading apparatus and the transfer apparatus 91 under the influence of inertia and gravity. Since the radiation measuring instrument 2 is installed at the inlet of the fuel element output pipe 88, the element dispenser 11 can determine the type of the element based on the detection results of the radiation measuring instrument 2, thereby transporting the spent fuel elements with strong radiation to the spent fuel loading apparatus 26 and transporting the graphite pebble elements with little radiation to the graphite pebble loading apparatus 39. The nuclear power plant spent fuel negative pressure unloading system provided by the present disclosure is a sealed system, and the oxygen content in the system is very little. During spent fuel loading, even if the temperature of the spent fuel is high, the spent fuel element will not undergo significant oxidation due to high temperature, thereby guaranteeing the integrity of the fuel elements within the transfer apparatus 91. It can be realized that the spent fuel elements and the graphite pebble elements are loaded simultaneously and can be loaded into the spent fuel transfer apparatus 94 and the graphite pebble transfer apparatus respectively for separate storage by the radiation measuring instrument 2 and the element dispenser 11 installed at the inlet of the fuel element output pipe 88.

Further, an iodine adsorber 13 is installed between the end of the gas transport pipe 1 in proximity to the fuel element unloading pipe 90 and the fan, and a dust filter 12 is also installed between the end of the gas transport pipe 1 in proximity to the fuel element unloading pipe 90 and the fan. The gas flows into the dust filter 12 installed in the ventilation device room 17 after flowing out of the fuel element transport pipe 87. The graphite dust in the gas can be filtered cleanly, and radioactive materials in the gas can be absorbed as the gas flows through the iodine adsorber 13. The spent fuel negative pressure unloading system in the embodiment of the present disclosure can maintain a negative pressure state in the fuel element transport pipe 87, the fuel loading apparatus and the transfer apparatus 91 in fuel loading process, which can effectively prevent the uncontrollable release of graphite dust and radioactive gases generated in the spent fuel and ensure that the graphite dust is retained by the dust filter 12 and the radioactive gases can be absorbed by the iodine adsorber 13, thereby guaranteeing the safety of the spent fuel loading system.

Further, an outlet pipe that is connected in parallel with the gas transport pipe 1 is connected to the outlet of the fan for connecting the atmosphere. Specifically, two fans are installed in parallel on the gas transport pipe 1, that is, a first fan 19 and a second fan 15, respectively. A first globe valve 22 is installed at the inlet of the first fan 19, a second globe valve 20 is installed on the pipe where the outlet of the first fan 19 is connected with the atmosphere, a third globe valve 21 is installed on the pipe where the outlet of the first fan 19 is connected with the gas transport pipe 1, a fourth globe valve 14 is installed at the inlet of the second fan 15, a fifth globe valve 16 is installed on the pipe where the outlet of the first fan 19 is connected with the atmosphere, and a sixth globe valve 18 is installed on the pipe where the outlet of the first fan 19 is connected with the gas transport pipe 1. Since the outlet of the first fan 19 is connected with external environment by the second globe valve 20, and the external environment is of one atmospheric pressure, the gas pressure in the fuel element transport pipe 87 can be adjusted to be lower than the atmospheric pressure through adjusting the opening degree of the second globe valve 20, thereby realizing negative pressure closed fuel loading function of the spent fuel. It can start an alternate second fan 15 and complete operating switch of the fan group by closing the first fan 19 and the first globe valve 22 on its front and the third globe valve 21 on its rear, opening the fourth globe valve 14 in front of the second fan 15 and the sixth globe valve 18 on the rear of the second fan 15 and starting the second fan 15. The two sets of the installed fan group satisfy redundant design requirements for the ventilation system, and improve the operating reliability of the ventilation system and the safety of the spent fuel unloading system.

Further, ball valves are installed on the pipes 11P through which the two outlets 11O of the element dispenser 11 are connected with the graphite pebble loading apparatus 39 and the spent fuel loading apparatus 26 respectively, that is, a second ball valve 6 and a third ball valve 23 respectively, for controlling opening and closing of respective pipes. Specifically, a fourth ball counter 5 is installed on the pipe between the second ball valve 6 and the graphite pebble loading apparatus, and a fifth ball counter 24 is installed on the pipe between the third ball valve 23 and the spent fuel loading apparatus 26. The fourth ball counter 5 is used to count the number of the elements which enter into the graphite pebble transfer apparatus through the graphite pebble loading apparatus 39, and the fifth ball counter 24 is used to count the number of elements which enter into the spent fuel transfer apparatus 94 through the spent fuel loading apparatus 26. Further, the first ball valve 10, the second ball valve 6 and the third ball valve 23 are driven by electric apparatus and can be remotely controlled and operated.

Figure 2:
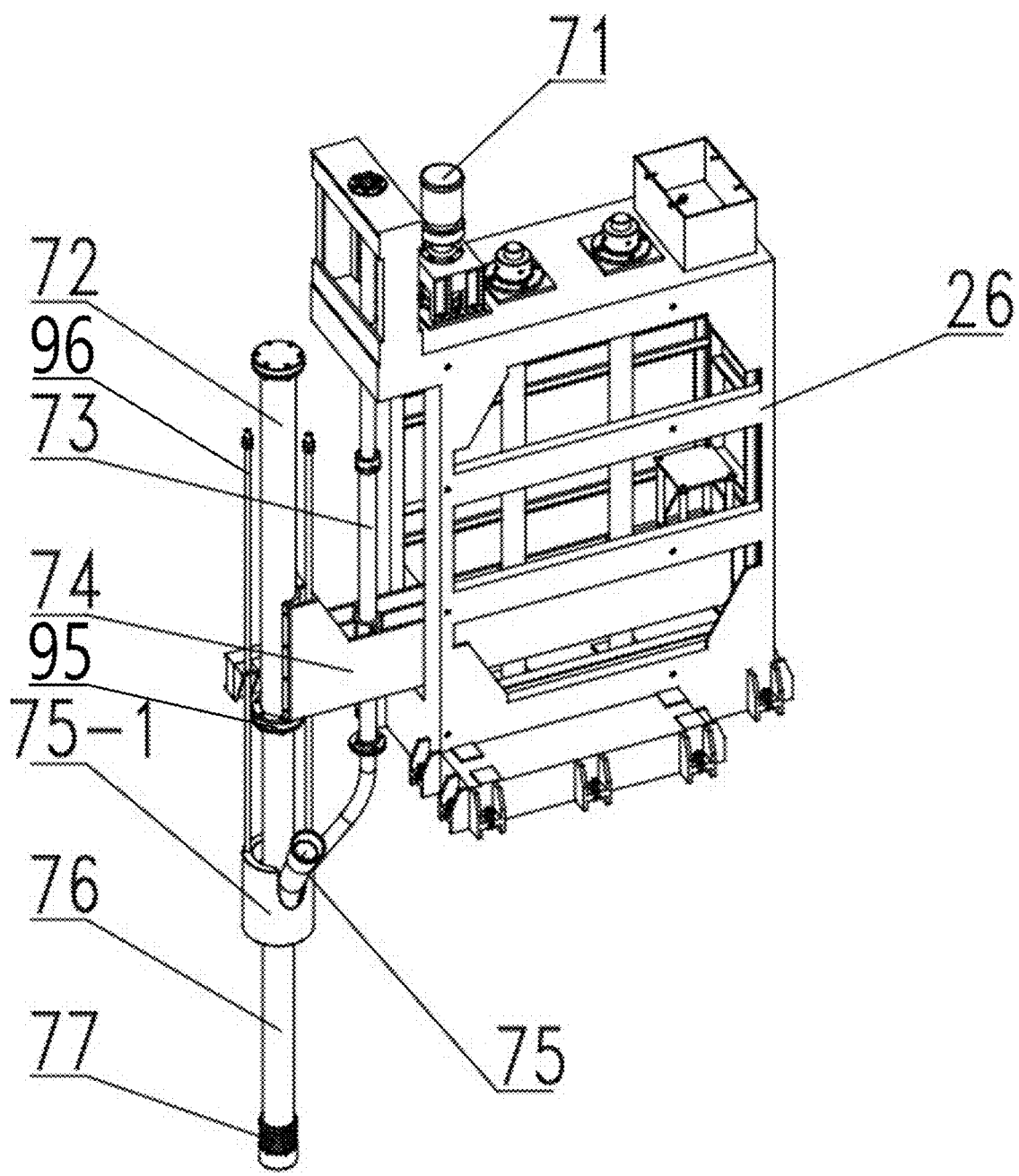
FIG. 2 is a structural schematic diagram of the spent fuel loading apparatus of an embodiment of the present disclosure.

Further, as illustrated in FIG. 2, the spent fuel loading apparatus 26 and the graphite pebble loading apparatus 39 comprises a feeding pipe 73, a fuel loading pipe 76, a lifting slider 74 and a driving motor 71; a canister plug claw 95 is installed in the fuel loading pipe 76, a cylinder 72 is installed above the fuel loading pipe 76, a telescopic rod 96 of the cylinder 72 is connected with the canister plug claw 95, and a fuel discharging port 77 is fixed to the lower end of the fuel loading pipe 76; one end of the feeding pipe 73 is connected with the distal end of the fuel element unloading pipe 90, and the other end is connected with the fuel loading pipe 76;

specifically, a fuel loading skew tee 75 is also installed at the junction of the fuel loading pipe 76 and the feeding pipe 73, and the other outlet of the fuel loading skew tee 75 is a drawing pebble port from which the fuel elements can be drawn. The cylinder 72 is fixedly connected to the lifting slider 74, and the driving motor 71 is used to drive the lifting slider 74 to move up and down by a screw. Specifically, the spent fuel loading apparatus 26 is similar to the graphite pebble loading apparatus 39, but the spent fuel loading apparatus 26 also comprises a radiation shielding cylindrical body 75-1 installed on the external side of the fuel loading skew tee 75. The spent fuel loading apparatus 26 and the graphite pebble loading apparatus 39 provided in the embodiment of the present disclosure can dock with the nozzle of the spent fuel storage canister 33 and the graphite pebble storage canister 38 in seal way, which is not only flexible and reliable, but also can effectively guarantees the sealing property of the spent fuel negative pressure unloading system.

Figure 4:
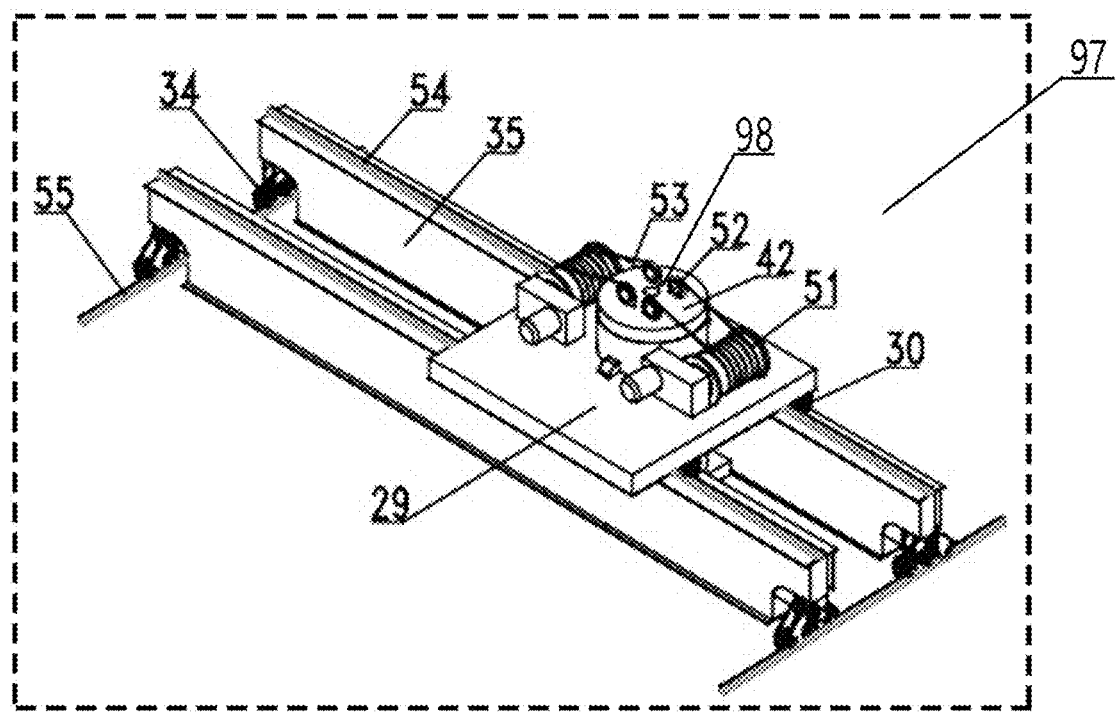
FIG. 4 is a structural schematic diagram of the spent fuel storage canister moving mechanism of an embodiment of the present disclosure.

Further, as illustrated in FIG. 1 and FIG. 4, the transfer apparatus 91 comprises a storage canister, a shield top cover 42, a shield cylindrical body 28, a movable bottom plate 32 which realizes opening and closing of the shield cylindrical body 28 by drawing, a moving mechanism 97 which drives the storage canister to move in two vertical directions, and a hoisting system for hoisting the storage canister, wherein the shield top cover 42 and the shield cylindrical body 28 are connected and fixed, the movable bottom plate 32 is located at the bottom of the shield cylindrical body 28 for supporting the storage canister. Specifically, in the present embodiment, the movable bottom plate 32 is preferably a drawing bottom plate which can be drawn to both sides. A shield fuel loading port 98 is installed on the shield top cover 42. The hoisting system comprises: pulleys 52, which installed on the outer surface of the shield cover; hoisting hoister groups 51, the number of which matches the number of the pulleys 52, and the hoisting hoister groups are installed outside of the shield cylindrical body 28; and a hanger 43, which is installed in the inner cavity of the shield cylindrical body 28, connected to the hoisting hoister groups 51 by wire ropes 53 for hoisting the spent fuel storage canister 33. In the present disclosure, it is provided with 4 pulleys 52. 4 wire ropes 53 extended from the two sets of the hoisting hoister groups 51 enter into the internal cavity of the shield cylindrical body 28 through channels for wire ropes 53 installed on the shield top cover 42 after passing the pulleys 52 and are fixedly installed on the hangers 43. The two sets of the hoisting hoister groups 51 can satisfy the single failure criteria and ensure the safety and reliability of the hoisting operation of the storage canister. Specifically, the graphite pebble transfer apparatus does not have radiation, the design of the shield is omitted. Moreover, in order to simplify the structure of the unloading system, the hoisting system is not designed in the graphite pebble transfer apparatus. When it is required to hoist the graphite pebble storage canister 38, it is moved to the hoisting port of the spent fuel transfer apparatus 94 for hoisting.

Figure 3:
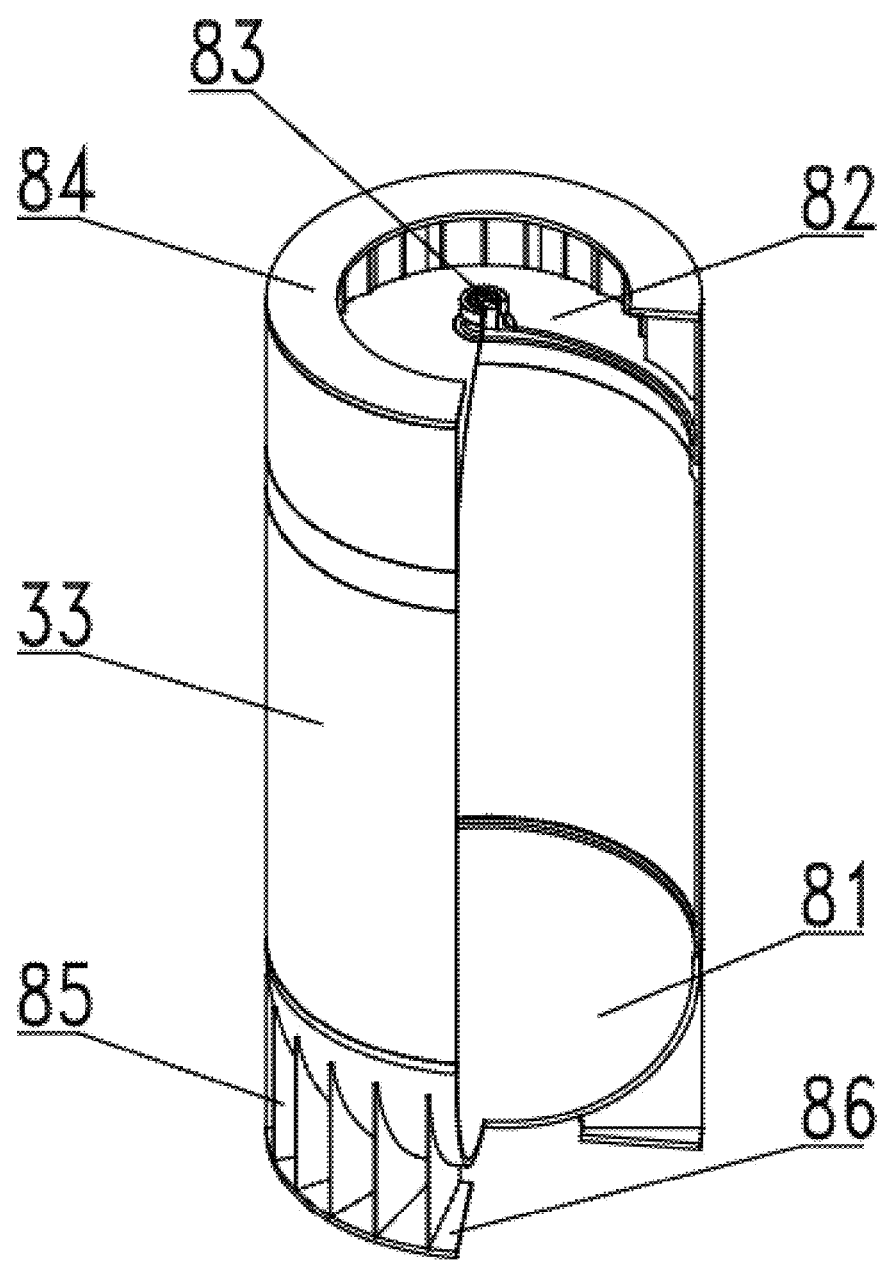
FIG. 3 is a structural schematic diagram of the spent fuel storage canister of an embodiment of the present disclosure.

Specifically, as illustrated in FIG. 3, the spent fuel storage canister 33 and the graphite pebble storage canister 38 both have cylindrical body, an elliptic head plate 82 is installed on the upper part of the cylindrical body and a spherical head plate 81 is installed on the bottom of the cylindrical body. A top plate 84 is installed on the top of the cylindrical body, and a nozzle 83 is installed at the middle position of the elliptic head plate 82. Supporting bottom plates 86 with a circumferentially uniform arrangement are installed on the bottom of the cylindrical body of the spent fuel storage canister 33. Supporting ribs 85 with a circumferentially uniform arrangement are also installed between the supporting bottom plate 86 and the spherical head plate 81. The supporting ribs 85 not only plays a role of supporting the storage canister, but also plays a role of buffering in the falling process of the storage canister, thereby protecting the integrity of the storage canister. The spent fuel storage canister 33 and the graphite pebble storage canister are both made of stainless steel material, which have advantages of long service life, good impact resistance, reliable sealing, and easy to lift and transport, thereby realizing long-term safe storage of the spent fuel elements and the graphite pebble elements.

Further, as illustrated in FIG. 4, the spent fuel storage canister 33 moving mechanism, which can drive the spent fuel storage canister 33 to move in two vertical directions, comprising a bridge 35 and a trolley 29, which is perpendicular to each other, and a bridge rail 55 and a trolley rail 54, which is perpendicular to each other also. The trolley rail 54 is installed on the bridge 35, a small wheel group 30 of the trolley 29 can operate laterally on the bridge 35 along the trolley rail 54, and a large wheel group 34 of the bridge 35 can operates longitudinally on the ground along the bridge rail 55. A through hole is set on the trolley 29, the shield cylindrical body is fixed in the through hole of the trolley 29, and the hoisting hoister group 51 is also fixed on the upper surface of the trolley 29.

Figure 5:
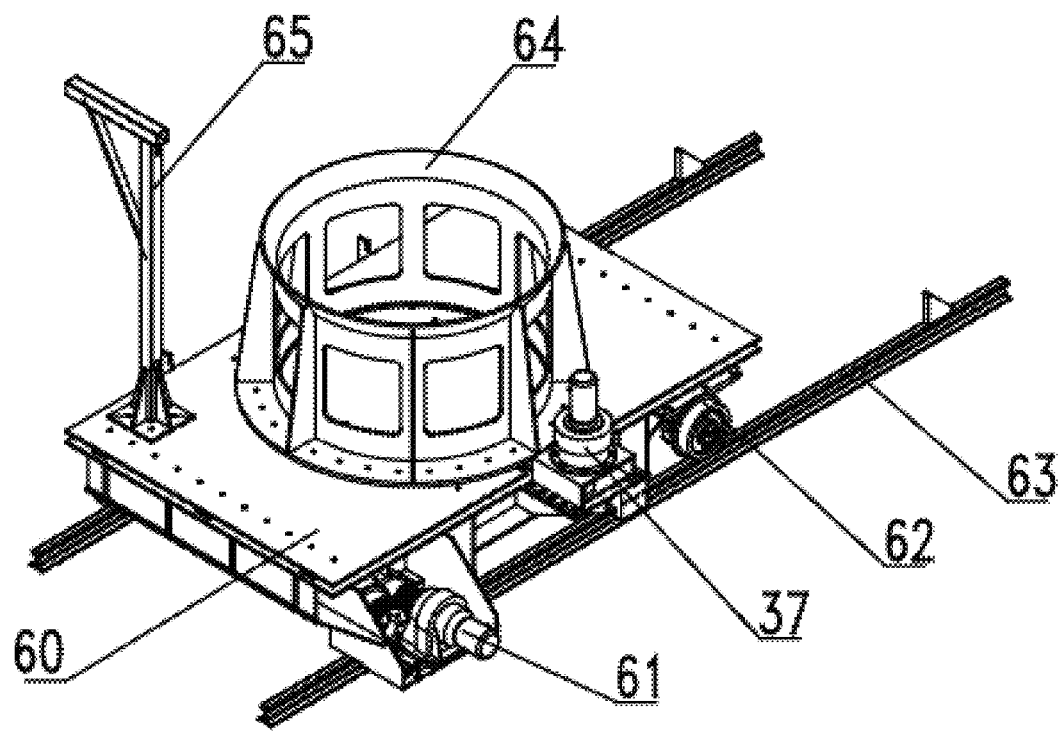
FIG. 5 is a structural schematic diagram of the graphite pebble storage canister moving mechanism of an embodiment of the present disclosure.

Further, as illustrated in FIG. 5, the graphite pebble storage canister 38 moving mechanism, which can drive the graphite pebble storage canister 38 to move in two vertical directions, comprising a railcar 36 and a longitudinal rail 63. The railcar 36 comprises an upper panel 60 and a walking wheel group 62 matching with the longitudinal rail 63. The railcar 36 also comprises an auxiliary driving motor 37, which can drive the upper panel 60 to move laterally, and a primary driving motor 61, which can drive the railcar 36 to move along the longitudinal rail 63. A fixed mount 64 of the graphite pebble storage canister 38 is also installed on the upper plate 60 of the railcar 36. In the loading process of the graphite pebble elements, the graphite pebble storage canister 38 can be placed in its fixed mount 64. A sliding bracket 65 is also installed on the upper plate 60 of the railcar 36 for power supply and control for the railcar 36 in moving process.

Further, as illustrated in FIG. 1, a vent 99 connected to an air intake pipe 31 is set on the movable bottom plate 32, and a vent 100 connected to an air exhaust pipe 27 is set on the shield top cover 42. The vent 99 on the movable bottom plate 32 and the vent 100 on the shield top cover 42 can realize ventilation of the storage canister. The vent 99 on the movable bottom plate 32 is used to introduce cooling air from the outside, and the fan installed on the top cover of the shield cylindrical body 28 can discharge residual heat of the storage canister to the air exhaust pipe 27, and thus discharge the residual heat to the outside atmosphere. It can realize safe radiation shield for the spent fuel storage canister 33 by disposing the shield cylindrical body 28, the shield top cover 42 and the movable bottom plate 32, and it can efficiently discharge the residual heat of the spent fuel storage canister 33 in fuel loading process through the air intake pipe 31 and the air exhaust pipe 27. The spent fuel storage canister 33 can be transported to each designated position by using of the moving mechanism 97 which drives the spent fuel storage canister 33 to move in two vertical directions, thereby completing any operation of hoisting and loading of the spent fuel storage canister 33. It can realize reliable fixing and precise positioning of the graphite pebble storage canister 38, which can be transported to each designated position, and complete any operation of hoisting and loading of the graphite pebble storage canister 38 by disposing the moving mechanism 97 which drives the graphite pebble storage canister 38 to move in two vertical directions.

The specific operating flow of the structural schematic diagram of the nuclear power plant spent fuel negative pressure unloading system of the embodiment of the present disclosure is as follows:

Firstly, hoisting the spent fuel storage canister 33 into the shield cylindrical body 28 by the hanger 43, and placing it on the movable bottom plate 32. Moving and positioning the shield cylindrical body 28 to the spent fuel loading position by the bridge 35 and the trolley 29, and start-up the fan installed on the top cover of the shield cylindrical body 28 to suck cooling air from the air intake pipe 31 and discharge it to the outside atmosphere through the residual heat exhaust pipe 27 so as to discharge the residual heat emitted from the spent fuel storage canister 33.

Operating the slider driving motor 71 on the spent fuel loading apparatus 26 to drive the lifting slider 74 to move downward, which drives the cylinder 72 and the fuel loading pipe 76 and other parts to move downward, insert the fuel loading pipe 76 into the center hole on the top cover of the shield cylindrical body 28, connect the fuel element discharging port 77 with the nozzle 83 of the spent fuel storage canister 33 within the shield cylindrical body 28, and drive canister plug claw 95 to slide up and down by the cylinder 72, thereby taking out and putting back the canister plug of the spent fuel storage canister 33.

Then, hoisting the graphite pebble storage canister 38 onto the railcar 36, placing the graphite pebble storage canister 38 into its fixed mount 64, and moving and positioning the graphite pebble storage canister 38 to the graphite pebble loading position by operation of the primary driving motor 61 and the auxiliary driving motor 37 of the railcar 36.

The operating steps of operating the graphite pebble loading apparatus are similar to that of operating the spent fuel loading apparatus, which needs to connect the fuel element discharging port 77 with the nozzle 83 of the spent fuel storage canister 33.

After that, opening the first globe valve 22 in front of the first fan 19 and the third globe valve 21 on the rear of the first fan 19, closing the fourth globe valve 14 in front of the second fan 15 and the sixth globe valve 18 on the rear of the second fan 15, starting the first fan 19, and adjusting the second globe valve 20 to a suitable opening degree, so that the transport speed of the spent fuel elements can satisfy design requirements. The transport speed of the spent fuel elements can be read out from several ball counters at different positions. Opening the first ball valve 10, the second ball valve 6 and the third ball valve 23 on the spent fuel element transport pipe 87.

Whether or not the fuel elements discharged from the reactor have radiation can be determined at the radiation measuring instrument 2. According to the result of radiation measurement, if it is determined to be a spent fuel element, the element dispenser 11 operates, so that the fuel element unloading pipe 90 is connected to the spent fuel loading apparatus 26, and then the spent fuel element is transported to the downstream of the first gas diverter 3 and lifted to the top from the fuel element lifting pipe 89 behind the ball counters under the driving of gas in the gas transport pipe 1 above the first gas diverter 3, and after that, the spent fuel element flows out of the fuel element transport pipe 87 under the action of inertia and gravity, and is loaded into the spent fuel storage canister 33 in the shield cylindrical body 28 through the spent fuel loading apparatus 26, thereby completing the fuel loading operation for the spent fuel element.

After the spent fuel storage canister 33 is filled up with the spent fuel elements and undergoes sealing processing, it is transported to a storage silo by the moving mechanism 97 which drives the spent fuel storage canister 33 to move in two vertical directions and hoisted into the storage silo by the hanger 43 for storage.

If the fuel elements discharged from the reactor is determined to be a graphite pebble element at the radiation measuring instrument 2, the element dispenser 11 operates, so that the fuel element unloading pipe 90 is connected to the graphite pebble loading apparatus 39, and then the graphite pebble element is transported to the downstream of the first gas diverter 3 and lifted to the top from the fuel element lifting pipe 89 behind the ball counters under the driving of gas in the gas transport pipe 1 above the first gas diverter 3, and after that, the graphite pebble element flows out of the fuel element transport pipe 87 under the action of inertia and gravity, and is loaded into the graphite pebble storage canister 38 by the graphite pebble loading apparatus 39, thereby completing the fuel loading operation for the graphite pebble element.

After the graphite pebble storage canister 38 is filled up with the graphite pebble elements and undergoes sealing processing, it is transported to a hoisting port by the moving mechanism 97 which drives the graphite pebble storage canister 38 to move in two vertical directions and hoisted into the shield cylindrical body 28 through operation of the hanger 43, and then it is transported to a storage silo through the moving mechanism 97 which drives the spent fuel storage canister 33 to move in two vertical directions and hoisted into the silo by the hanger 43 for storage.

After the driving gas flows into the fuel element transport pipe 87 from the upper end of the first gas diverter 3, it drives the fuel elements to transport forward and lifts the fuel elements to the top of the transport pipe from the fuel element lifting pipe 89 behind the ball counters. And then, the gas flows out of the gas transport pipe 1 above the second gas diverter 8 mounted on the fuel element unloading pipe 90. After that, the driving gas flows into the dust filter 12 in the ventilation device room, where the graphite dust in the driving gas is filtered cleanly. After clean air flows out of the dust filter 12, the radioactive material in the air is absorbed in the iodine adsorber 13. After that, the gas flows through the first globe valve 22 in front of the first fan 19, and then flows into the first fan 19, and the gas is pressurized by the first fan 19, after that the gas flows through the third globe valve 21 on the rear of the first fan 19, then the gas flows back to the upper inlet of the first gas diverter 3 through the gas transport pipe 1, and then the gas flows into the fuel element transport pipe 87 again, thereby completing a closed circulation. Since the outlet of the first fan 19 is connected with external environment by the second globe valve 20, and the external environment is of one atmospheric pressure, the gas pressure in the fuel element transport pipe 87 can be adjusted to be lower than the atmospheric pressure by adjusting the opening degree of the second globe valve 20, thereby realizing negative pressure closed fuel unloading function of the spent fuel. It can start-up an alternate second fan 15 and complete operating switch of the fan group by closing the first fan 19 and the first globe valve 22 on its front and the third globe valve 21 on its rear, opening the fourth globe valve 14 in front of the second fan 15 and the sixth globe valve 18 on the rear of the second fan 15, and then the second fan 15 can be started-up.

In summary, the nuclear power plant spent fuel negative pressure unloading system of the present disclosure has the following advantages:

1. The nuclear power plant spent fuel negative pressure unloading system provided by the present disclosure is a sealed system, and the oxygen content in the system is very little. During spent fuel unloading period, even if the temperature of the spent fuel is high, the spent fuel element will not undergo significant oxidation due to high temperature, thereby guaranteeing the integrity of the fuel elements within the transfer apparatus. It can be realized that the spent fuel elements and the graphite pebble elements are unloaded into the spent fuel transfer apparatus and the graphite pebble transfer apparatus simultaneously and respectively for separate storage through the usage of the radiation measuring instrument and the element dispenser installed at the inlet of the fuel element output pipe.

2. The spent fuel negative pressure unloading system provided in the present disclosure can maintain a negative pressure state for the fuel element transport pipe, the fuel loading apparatus and the transfer apparatus in the fuel unloading process, which can effectively prevent the uncontrollable release of graphite dust and radioactive gases generated in the spent fuel and ensure that the graphite dust is retained in the dust filter and the radioactive gases can be absorbed in the iodine adsorber, thereby guaranteeing the safety of the spent fuel unloading system.

3. The two sets of the installed fan group of the spent fuel negative pressure unloading system provided in the present disclosure can satisfy redundant design requirements for the ventilation system, and can improve the operating reliability of the ventilation system and the safety of the spent fuel unloading system.

4. The spent fuel loading apparatus and the graphite pebble loading apparatus of the spent fuel negative pressure unloading system provided in the present disclosure can be sealed when docking with the nozzle of the spent fuel storage canister and the graphite pebble storage canister, which is not only flexible and reliable, but also can effectively guarantee the sealing property of the spent fuel negative pressure unloading system.

5. The spent fuel negative pressure unloading system provided in the present disclosure can realize safe radiation shield of the spent fuel storage canister by disposing the shield cylindrical body, the shield top cover and the movable bottom plate. It can efficiently discharge the residual heat of the spent fuel storage canister in the loading process by disposing the air intake pipe and the air exhaust pipe. The spent fuel storage canister can be transported to each designated position by disposing the moving mechanism which drives the spent fuel storage canister to move in two vertical directions, thereby completing any operation of hoisting and loading of the spent fuel storage canister. It can realize reliable fixing and precise positioning of the graphite pebble storage canister, which can be transported to each designated position, and complete any operation of hoisting and loading of the graphite pebble storage canister by disposing the moving mechanism which drives the graphite pebble storage canister to move in two vertical directions.

The spent fuel negative pressure unloading system described in the embodiment in the present disclosure, which is used for a pebble bed high temperature reactor nuclear power plant, can also be used for spent fuel transport and unloading of other similar nuclear power plants by suitable modification.

Finally, it is to be noted that the embodiments above are only used to explain the technical solutions of the present disclosure, and are not intended to be limiting thereto; although the present disclosure has been described in detail with reference to the foregoing embodiments, it should be understood by those of ordinary skilled in the art that the technical solutions described in the foregoing embodiments may be modified or equivalently replaced with some of the technical features; while these modifications or replacements do not make the essence of corresponding technical solutions to depart from the spirit and scope of various embodiments of the present disclosure.

What is claimed is:

1. A nuclear power plant spent fuel negative pressure unloading system, comprising: a fuel element transport pipe and a gas transport pipe,
   wherein:
   the fuel element transport pipe comprises a fuel element output pipe, a fuel element lifting pipe, and a fuel element unloading pipe connected in series, the fuel element unloading pipe is arranged obliquely downward in the direction of movement of a fuel element, and the distal end of the fuel element unloading pipe is connected sequentially to a fuel loading apparatus and a transfer apparatus;
   the gas transport pipe is connected to either end of set positions of the fuel element output pipe and the fuel element unloading pipe respectively, a gas driving mechanism is connected to the gas transport pipe, and an inlet of the gas driving mechanism is arranged at one end in proximity to the fuel element unloading pipe for sucking gas in the fuel element transport pipe, the fuel loading apparatus and the transfer apparatus, and then release the gas to the fuel element output pipe via the gas transport pipe so as to drive the movement of the fuel element.

2. The nuclear power plant spent fuel negative pressure unloading system of claim 1, wherein an iodine adsorber is installed between the end of the gas transport pipe in proximity to the fuel element unloading pipe and the gas driving mechanism.

3. The nuclear power plant spent fuel negative pressure unloading system of claim 1, wherein a dust filter is installed between the end of the gas transport pipe in proximity to the fuel element unloading pipe and the gas driving mechanism.

4. The nuclear power plant spent fuel negative pressure unloading system of claim 1, wherein an outlet pipe in parallel with the gas transport pipe is connected to an outlet of the gas driving mechanism for connecting the atmosphere.

5. The nuclear power plant spent fuel negative pressure unloading system of claim 1, wherein the fuel elements comprise spent fuel elements and graphite pebble elements.

6. The nuclear power plant spent fuel negative pressure unloading system of claim 5, wherein a radiation measuring instrument is installed at the inlet of the fuel element output pipe, the fuel loading apparatus and the transfer apparatus comprise a graphite pebble loading apparatus and a graphite pebble transfer apparatus connected sequentially and a spent fuel loading apparatus and a spent fuel transfer apparatus connected sequentially, an element dispenser is installed at the distal end of the fuel element unloading pipe, and two outlets of the element dispenser are connected with the graphite pebble loading apparatus and the spent fuel loading apparatus through pipes, respectively.

7. The nuclear power plant spent fuel negative pressure unloading system of claim 6, wherein ball valves are installed on the pipes through which the two outlets of the element dispenser are connected with the graphite pebble loading apparatus and the spent fuel loading apparatus respectively, for controlling opening and closing of the pipes.

8. The nuclear power plant spent fuel negative pressure unloading system of claim 1, wherein the fuel loading apparatus comprises a feeding pipe, a fuel loading pipe, a lifting slider and a driving motor; a canister plug claw is installed in the fuel loading pipe, a cylinder is installed above the fuel loading pipe, a telescopic rod of the cylinder is connected with the canister plug claw, and a fuel discharging port is fixed to the lower end of the fuel loading pipe; one end of the feeding pipe is connected with the distal end of the fuel element unloading pipe, and the other end is connected with the fuel loading pipe; the cylinder is fixedly connected to the lifting slider, and the driving motor is used to drive the lifting slider to move up and down.

9. The nuclear power plant spent fuel negative pressure unloading system of claim 1, wherein the transfer apparatus comprises a storage canister, a shield top cover, a shield cylindrical body, a movable bottom plate which realizes opening and closing of the shield cylindrical body, a moving mechanism which drives the storage canister to move in two vertical directions, and a hoisting system for hoisting the storage canister, wherein the shield top cover and the shield cylindrical body are connected and fixed, the movable bottom plate is located at the bottom of the shield cylindrical body for supporting the storage canister, and a shield fuel loading port is installed on the shield top cover.

10. The nuclear power plant spent fuel negative pressure unloading system of claim 9, wherein a vent which is connected with an air intake pipe is set on the movable bottom plate; and a vent which is connected with an air exhaust pipe is set on the shield top cover.

* * * * *